(12) United States Patent
Hwang

(10) Patent No.: US 10,831,643 B2
(45) Date of Patent: *Nov. 10, 2020

(54) DETECTING POTENTIAL CLASS LOADER PROBLEMS USING THE CLASS SEARCH PATH SEQUENCE FOR EACH CLASS LOADER

(71) Applicant: International Business Machines Corporation, Armonk, NY (US)

(72) Inventor: Jinwoo Hwang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 15/080,470

(22) Filed: Mar. 24, 2016

(65) Prior Publication Data
US 2016/0210223 A1 Jul. 21, 2016

Related U.S. Application Data

(63) Continuation of application No. 14/300,010, filed on Jun. 9, 2014, now Pat. No. 9,355,011.

(51) Int. Cl.
*G06F 11/36* (2006.01)
*G06F 9/448* (2018.01)
(Continued)

(52) U.S. Cl.
CPC .......... *G06F 11/3672* (2013.01); *G06F 8/315* (2013.01); *G06F 8/70* (2013.01);
(Continued)

(58) Field of Classification Search
CPC ...... G06F 9/445; G06F 9/44521; G06F 9/466; G06F 11/3466
See application file for complete search history.

(56) References Cited

U.S. PATENT DOCUMENTS

| 6,530,080 | B2 | 3/2003 | Fresko et al. | |
|---|---|---|---|---|
| 2003/0177484 | A1* | 9/2003 | Bosschaert | G06F 9/445 717/166 |

(Continued)

OTHER PUBLICATIONS

Markus Eisele, "Enterprise Software Development with Java: Using the New WebLogic Classloader Analysis Tool (CAT)," http://blog.eisele.net/2011/01/using-new-weblogic-classloader-analysis.html, Jan. 17, 2011, pp. 1-8.

(Continued)

*Primary Examiner* — Jigar P Patel
(74) *Attorney, Agent, or Firm* — Robert A. Voigt, Jr.; Winstead PC

(57) ABSTRACT

A method, system and computer program product for identifying potential class loader problems prior to or during the deployment of the classes to the production environment. A set of class loaders is loaded into memory. The set of class loaders is arranged hierarchically into parent-child relationships. The class search path sequence for each class loader in the hierarchy is generated to detect and identify potential class loader problems. Those class loaders with a duplicate class in its class search path sequence are identified as those class loaders that may pose a potential problem. A message may then be displayed to the user identifying these class loaders as posing a potential problem. By identifying these class loaders prior to or during the deployment of the classes to the production environment, class loader problems may be prevented from occurring.

16 Claims, 5 Drawing Sheets

(51) Int. Cl.
*G06F 8/75* (2018.01)
*G06F 8/70* (2018.01)
*G06F 8/30* (2018.01)

(52) U.S. Cl.
CPC .............. *G06F 8/75* (2013.01); *G06F 9/449* (2018.02); *G06F 11/362* (2013.01); *G06F 11/3608* (2013.01)

(56) References Cited

U.S. PATENT DOCUMENTS

| | | | |
|---|---|---|---|
| 2004/0168162 A1* | 8/2004 | Park | G06F 9/45516 717/166 |
| 2005/0235010 A1* | 10/2005 | Bates | G06F 9/4436 |
| 2007/0169072 A1 | 7/2007 | Corrie | |
| 2008/0127155 A1 | 5/2008 | Abdelhadi et al. | |
| 2010/0070960 A1 | 3/2010 | Atsatt | |
| 2012/0174084 A1* | 7/2012 | Chapman | G06F 9/44521 717/166 |

OTHER PUBLICATIONS

List of IBM Patents or Patent Applications Treated as Related, Mar. 25, 2016, pp. 1-2.
Office Action for U.S. Appl. No. 15/080,424 dated Aug. 24, 2017, pp. 1-20.
Office Action for U.S. Appl. No. 15/080,424 dated Feb. 28, 2018, pp. 1-19.

* cited by examiner

DETECTING POTENTIAL CLASS LOADER PROBLEMS USING THE CLASS SEARCH PATH SEQUENCE FOR EACH CLASS LOADER

TECHNICAL FIELD

The present invention relates generally to class loaders, and more particularly to detecting potential class loader problems using the class search path sequence for each class loader in a set of class loaders arranged hierarchically into parent-child relationships.

BACKGROUND

A class loader, such as a Java® class loader, dynamically loads classes into a virtual machine. Usually, these classes are only loaded on demand as discussed below.

A software library is a collection of related object code. In the Java® language, libraries are typically packaged in JAR (Java® ARchive) files. Libraries can contain objects of different types. The most important type of object contained in a JAR file is a Java® class. A class can be thought of as a named unit of code. The class loader is responsible for locating libraries, reading their contents, and loading the classes contained within the libraries. This loading is typically done "on demand," in that it does not occur until the class is actually used by the program. A class with a given name can only be loaded once by a given class loader.

Unfortunately, problems may occur when the class loader loads the classes, such as class cast exceptions (indicates that the code has attempted to cast an object to a subclass of which it is not an instance), class not found exceptions (e.g., class is not visible on the logical classpath of the context class loader, the application incorrectly uses a class loader API, a dependent class is not visible), no class definition found exceptions (e.g., class is not in the logical class path, class cannot load), etc.

Currently, when a class loader problem occurs, traces, logs or memory dumps are analyzed to determine the causes of the class loader errors. However, such analysis occurs after the classes have been deployed to the production environment involving time consuming analysis to debug these problems, especially in large and complex product enterprise environments. If, however, potential class loader problems could be identified or detected prior to or during the deployment of the classes to the production environment, then class loader errors could be eliminated (e.g., eliminate a class cast exception error) thereby saving programmers time from no longer having to debug class loader problems.

Unfortunately, there is not currently a means for identifying or detecting potential class loader problems prior to or during the deployment of the classes to the production environment.

SUMMARY

In one embodiment of the present invention, a method for identifying potential class loader problems comprises loading a set of class loaders into memory. The method further comprises arranging the set of class loaders hierarchically into parent-child relationships. The method additionally comprises generating, by a processor, a class search path sequence for each class loader. Furthermore, the method comprises identifying one or more class loaders with a duplicate class in its class search path sequence. In addition, the method comprises displaying a message identifying the identified one or more class loaders as being potentially problematic.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for identifying potential class loader problems prior to or during the deployment of the classes to the production environment. In one embodiment of the present invention, a set of class loaders is loaded into memory. The set of class loaders is arranged hierarchically into parent-child relationships. The class search path sequence for each class loader in the hierarchy is generated to detect and identify potential class loader problems. Those class loaders with a duplicate class in its class search path sequence are identified as those class loaders that may pose a potential problem. Those class loaders having the first class in the duplicate class recited in its class search path sequence being one of the class loader's classes may be identified as causing more of a potential problem than those class loaders having the first class in the duplicate class recited in its class search path sequence not being one of the class loader's classes. A message may then be displayed to the user identifying these class loaders as posing a potential problem. By identifying these class loaders prior to or during the deployment of the classes to the production environment, class loader problems may be prevented from occurring.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
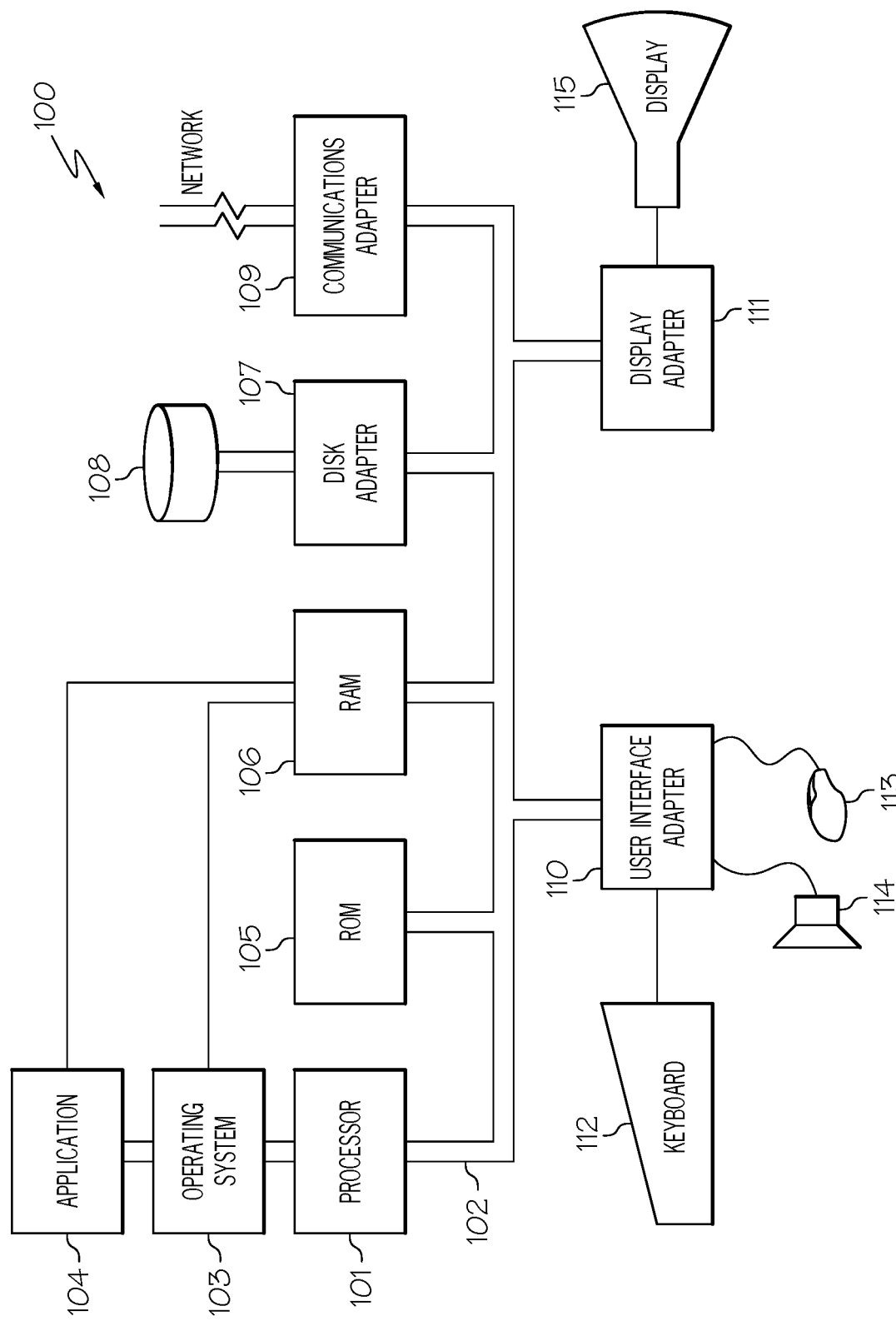
FIG. 1 illustrates a hardware configuration of a computer system configured in accordance with an embodiment of the present invention.

Referring now to the Figures in detail, FIG. 1 illustrates a hardware configuration of a computer system 100 which is representative of a hardware environment for practicing the present invention. Computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for identifying potential class loader problems prior to or during the deployment of the classes to the production environment as discussed further below in association with FIGS. 2-5.

Referring again to FIG. 1, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for identifying potential class loader problems prior to or during the deployment of the classes to the production environment, as discussed further below in association with FIGS. 2-5, may reside in disk unit 108 or in application 104.

Computer system 100 may further include a communications adapter 109 coupled to bus 102. Communications adapter 109 interconnects bus 102 with an outside network thereby enabling computer system 100 to communicate with other such systems.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 and receiving output from computer system 100 via display 115 or speaker 114.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, problems may occur when the class loader loads the classes, such as class cast exceptions (indicates that the code has attempted to cast an object to a subclass of which it is not an instance), class not found exceptions (e.g., class is not visible on the logical classpath of the context class loader, the application incorrectly uses a class loader API, a dependent class is not visible), no class definition found exceptions (e.g., class is not in the logical class path, class cannot load), etc. Currently, when a class loader problem occurs, traces, logs or memory dumps are analyzed to determine the causes of the class loader errors. However, such analysis occurs after the classes have been deployed to the production environment involving time consuming analysis to debug these problems, especially in large and complex product enterprise environments. If, however, potential class loader problems could be identified or detected prior to or during the deployment of the classes to the production environment, then class loader errors could be eliminated (e.g., eliminate a class cast exception error) thereby saving programmers time from no longer having to debug class loader problems. Unfortunately, there is not currently a means for identifying or detecting potential class loader problems prior to or during the deployment of the classes to the production environment.

Figure 2:
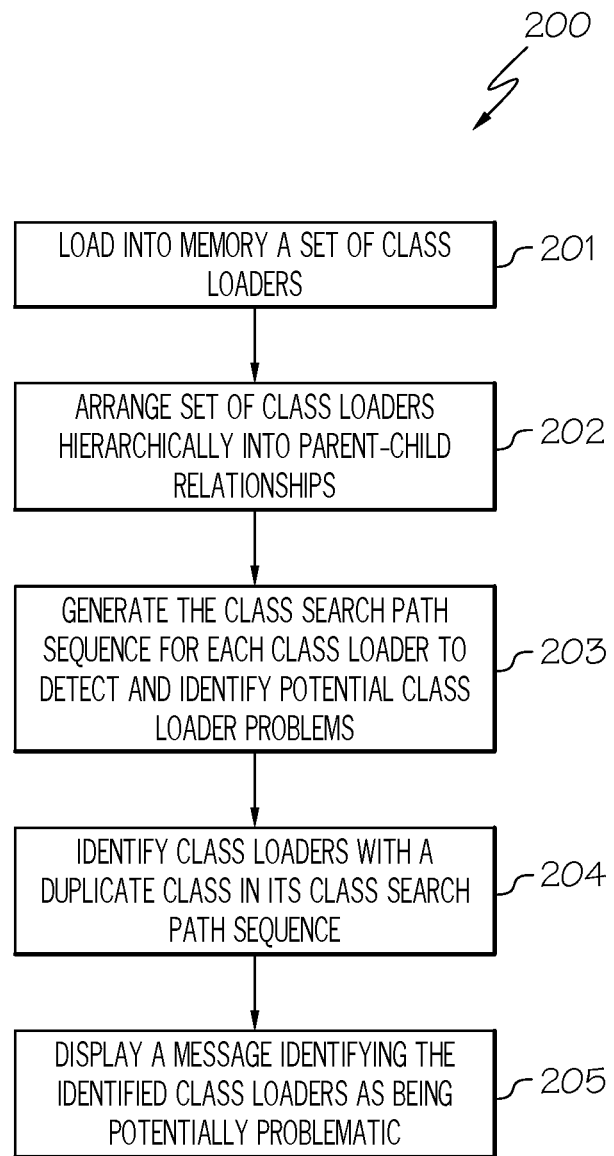
FIG. 2 is a flowchart of a method for identifying potential class loader problems prior to or during the deployment of the classes to the production environment in accordance with an embodiment of the present invention.
Figure 3:
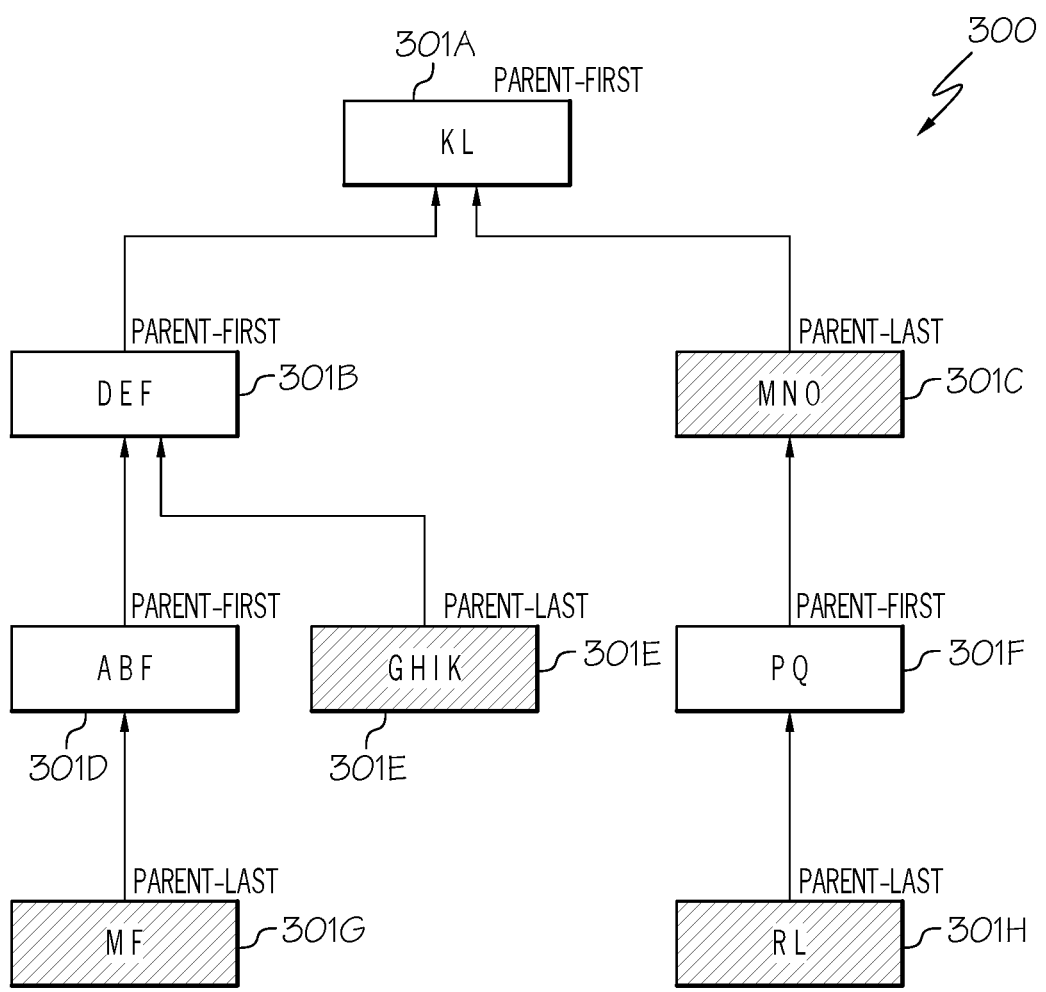
FIG. 3 illustrates a hierarchical arrangement of the class loaders in parent-child relationships in accordance with an embodiment of the present invention.
Figure 4:
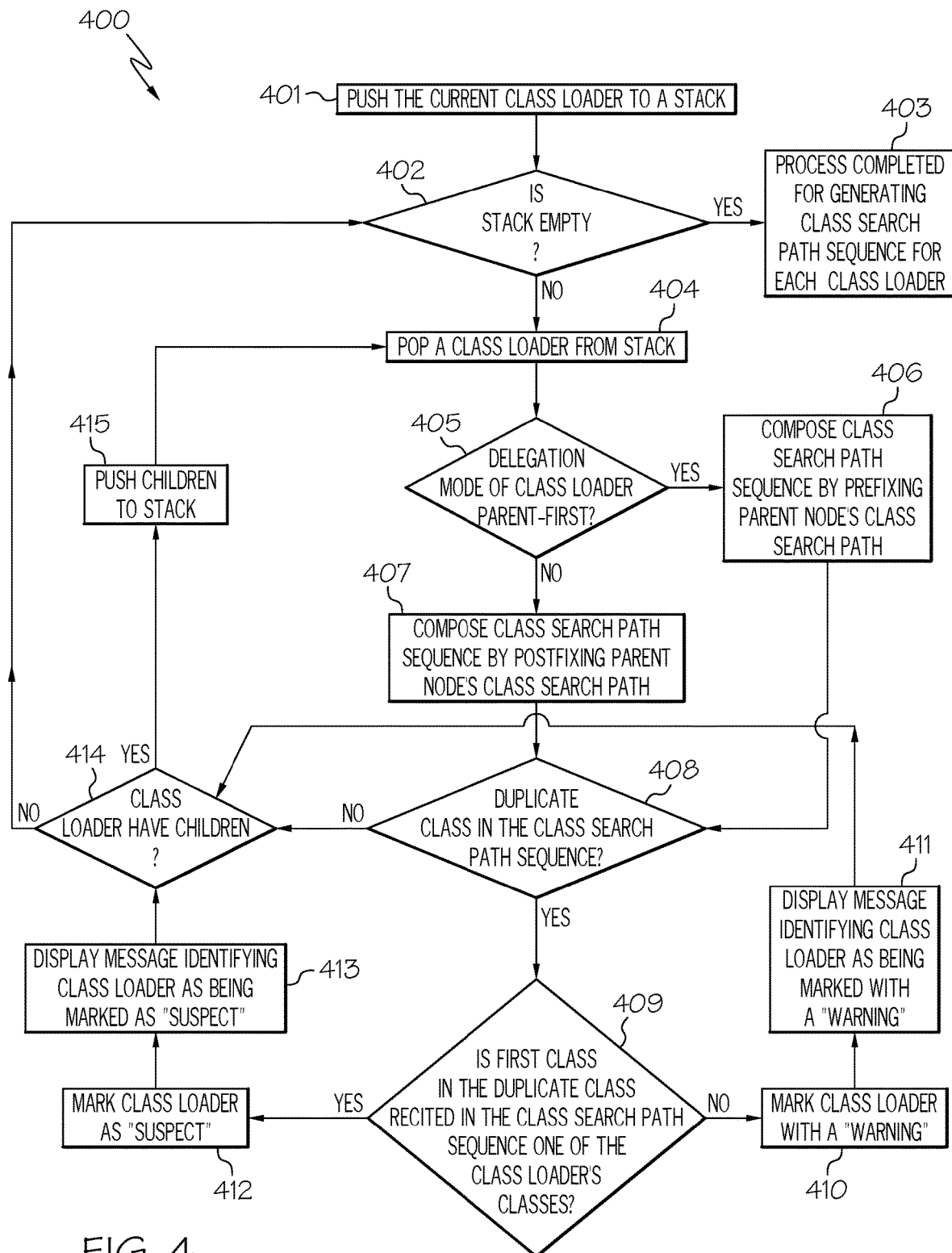
FIG. 4 is a flowchart of an algorithm implementing the sub-steps of steps 203-205 of the method of FIG. 2 in accordance with an embodiment of the present invention.
Figure 5:
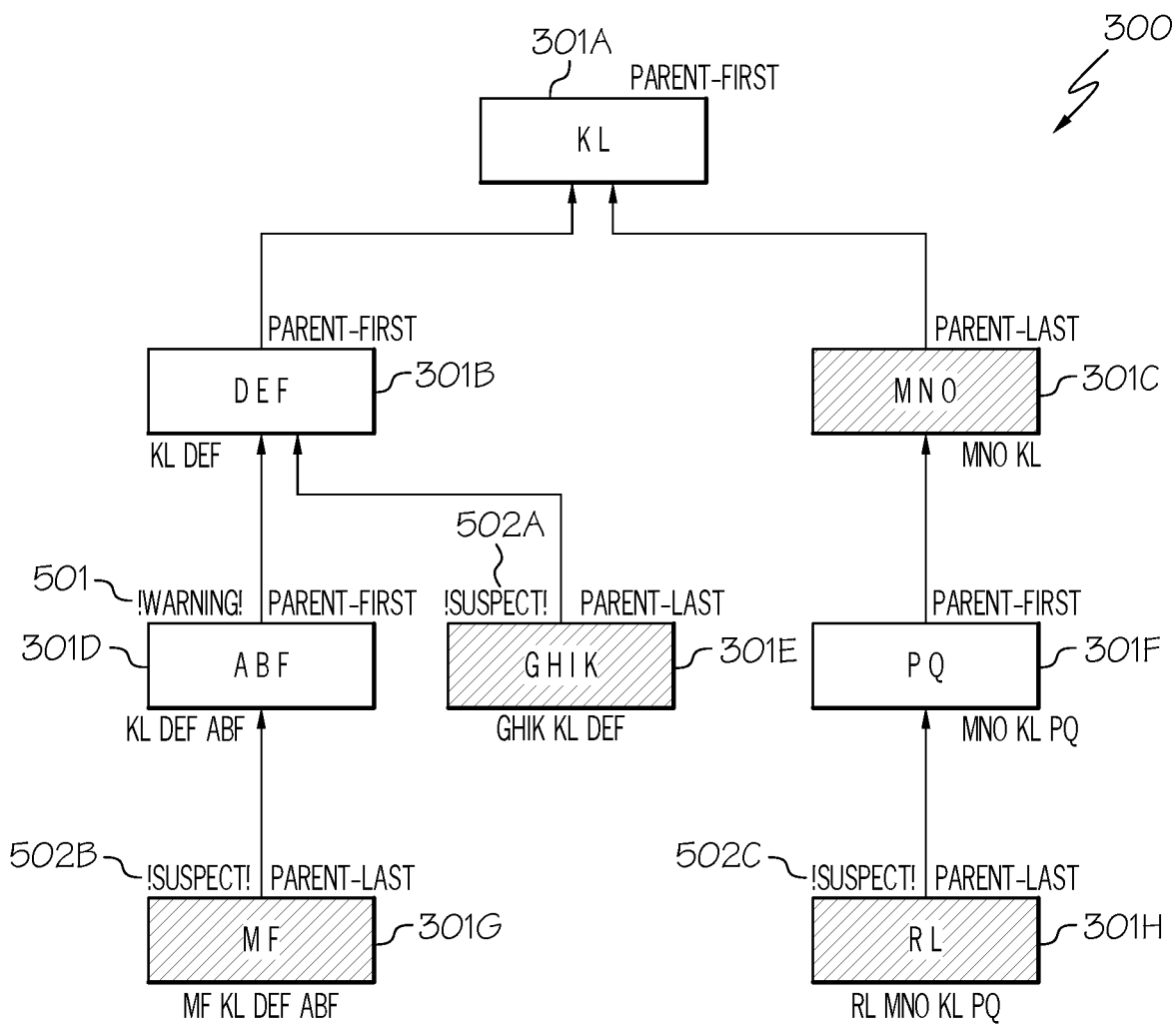
FIG. 5 illustrates the class search path sequence for each class loader in the hierarchical arrangement of FIG. 4 in accordance with an embodiment of the present invention.

The principles of the present invention provide a means for identifying or detecting potential class loader problems prior to or during the deployment of the classes to the production environment by utilizing the class search path sequence for each class loader in a set of class loaders arranged hierarchically into parent-child relationships as discussed further below in connection with FIGS. 2-5. FIG. 2 is a flowchart of a method for identifying potential class loader problems prior to or during the deployment of the classes to the production environment. FIG. 3 illustrates a hierarchical arrangement of the class loaders in parent-child relationships. FIG. 4 is a flowchart of an algorithm implementing the sub-steps of steps 203-205 of the method of FIG. 2. FIG. 5 illustrates the class search path sequence for each class loader in the hierarchical arrangement of FIG. 4.

As stated above, FIG. 2 is a flowchart of a method 200 for identifying potential class loader problems prior to or during the deployment of the classes to the production environment in accordance with an embodiment of the present invention.

Referring to FIG. 2, in conjunction with FIG. 1, in step 201, a set of class loaders is loaded into memory, such as memory 106.

In step 202, the set of class loaders is arranged hierarchically into parent-child relationships as illustrated in FIG. 3. FIG. 3 illustrates a hierarchical arrangement 300 of the class loaders in parent-child relationships in accordance with an embodiment of the present invention.

Referring to FIG. 3, FIG. 3 illustrates hierarchical arrangement 300 of the class loaders utilizing a parent-delegation model. The delegation model requires that any request for a class loader to load a given class is first delegated to its parent class loader before the requested class loader tries to load the class itself. The parent class loader, in turn, goes throughout the same process of asking its parent. This chain of delegation continues through to the bootstrap or root class loader (also known as the primordial or system class loader). If a class loader's parent cannot load a given class, it returns that class. Otherwise, the class loader attempts to load the class itself.

As illustrated in FIG. 3, at the top of hierarchy 300 is the root or primordial class loader 301A. Class loader 301A has two children class loaders 301B, 301C. Class loader 301B has two child class loaders 301D, 301E, whereas, class loader 301C has a single child class loader 301F. As further illustrated in FIG. 3, class loader 301D has a single child class loader 301G and class loader 301F has a single child class loader 301H. Class loaders 301A-301H may collectively or individually be referred to as class loaders 301 or class loader 301, respectively. FIG. 3 is not to be limited in scope to any particular number of child class loaders 301. Each class loader 301 in hierarchical arrangement 300 of the class loaders may have zero or more child class loaders 301.

Furthermore, as illustrated in FIG. 3, each class loader 301 includes one or more loaded classes in the class loader. For example, root class loader 301A has class K and class L. Class loader 301B contains classes D, E and F. Class loader 301C contains classes M, N and O. Furthermore, class loader 301D contains classes A, B and F. Class loader 301E contains classes G, H, I and K. Class loader 301F contains classes P and Q. Additionally, class loader 301G contains classes M and F. Furthermore, class loader 301H contains classes R and L.

As further illustrated in FIG. 3, each class loader 301 is designated with either a parent-first or a parent-last delegation mode. Such a designation will be used to determine whether to append the class loader's parent node's class search path sequence before or after the class loader's classes as discussed in further detail below in connection with FIG. 5. A class search path sequence refers to the path used by a virtual machine or compiler to locate these classes.

Returning now to FIG. 2, in conjunction with FIGS. 1 and 3, in step 203, the class search path sequence for each class loader 301 in hierarchy 300 is generated to detect and identify potential class loader problems. A further description of the steps involved in generating the class search path sequence will be provided below in connection with FIG. 4.

In step 204, the class loaders with a duplicate class in its class search path sequence are identified. As will be discussed further below, those class loaders that contain a duplicate class in its class search path sequence may pose a potential problem. By incorporating the algorithm of the present invention to identify such class loaders during compile time or build time in a development environment (e.g., test system), those class loaders that are potentially problematic (i.e., those class loaders that have may have a problem loading the classes resulting in class cast exceptions, class not found exceptions, no class definition found exceptions, etc.) can be identified prior to or during the deployment of the classes thereby preventing the problems from occurring. A further description of the steps involves in identifying the class loaders with a duplicate class in the class search path sequence will be provided below in connection with FIG. 4.

In step 205, a message is displayed identifying the identified class loaders as being potentially problematic. A further description of the steps involves in displaying a message identifying the identified class loaders as being potentially problematic will be provided below in connection with FIG. 4.

Referring now to FIG. 4, FIG. 4 is a flowchart of an algorithm 400 for implementing the sub-steps of steps 203-205 of method 200 of FIG. 2 in accordance with an embodiment of the present invention.

Referring to FIG. 4, in conjunction with FIGS. 1-3, in step 401, the current class loader 301 is pushed to a stack. In one embodiment, hierarchical arrangement 300 of the class loaders as shown in FIG. 3 is implemented by a stack.

In step 402, a determination is made as to whether the stack is empty. If the stack is empty, then, in step 403, the process is completed for generating the class search path sequence for each class loader.

If, however, the stack is not empty, then, in step 404, a class loader is popped from the stack.

In step 405, a determination is made as to whether the delegation mode of the class loader is parent-first. If the delegation mode of the class loader is parent-first, then, in step 406, a class search path sequence is composed by prefixing the parent node's class search path.

If, however, the delegation mode of the class loader is not parent-first (i.e., parent-last), then, in step 407, a class search path sequence is composed by postfixing the parent node's class search path.

An illustration of composing the class search path sequence based on the delegation mode is shown in FIG. 5.

FIG. 5 illustrates the class search path sequence for each class loader 301 in hierarchical arrangement 300 of FIG. 3 utilizing algorithm 400 in accordance with an embodiment of the present invention.

Referring to FIG. 5, in conjunction with FIGS. 1-4, since class loader 301B has a delegation mode of parent-first, the class search path sequence for class loader 301B is composed by prefixing its parent node's class search path (the class search path of class loader 301A) to the class loader's classes thereby forming the class search path sequence of KL DEF.

In another example, class loader 301C has a delegation mode of parent-last. As a result, the class search path sequence for class loader 301C is composed by postfixing its parent node's class search path (the class search path of class loader 301A) to the class loader's classes thereby forming the class search path sequence of MNO KL.

Similarly, class loader 301D has a delegation mode of parent-first. As a result, the class search path sequence for class loader 301D is composed by prefixing its parent node's class search path (the class search path of class loader 301B) to the class loader's classes thereby forming the class search path sequence of KL DEF ABF.

In a further example, class loader 301E has a delegation mode of parent-last. As a result, the class search path sequence for class loader 301E is composed by postfixing its parent node's class search path (the class search path of class loader 301B) to the class loader's classes thereby forming the class search path sequence of GHIK KL DEF.

In another example, class loader 301F has a delegation mode of parent-first. As a result, the class search path sequence for class loader 301F is composed by prefixing its parent node's class search path (the class search path of class loader 301C) to the class loader's classes thereby forming the class search path sequence of MNO KL PQ.

Similarly, class loader 301G has a delegation mode of parent-last. As a result, the class search path sequence for class loader 301G is composed by postfixing its parent node's class search path (the class search path of class loader 301D) to the class loader's classes thereby forming the class search path sequence of MF KL DEF ABF.

In a further example, class loader 301H has a delegation mode of parent-last. As a result, the class search path sequence for class loader 301H is composed by postfixing its parent node's class search path (the class search path of class loader 301F) to the class loader's classes thereby forming the class search path sequence of RL MNO KL PQ.

Returning now to FIG. 4, in conjunction with FIGS. 1-3 and 5, in step 408, a determination is made as to whether there is a duplicate class in the class search path sequence.

If there is a duplicate class in the class search path sequence, then, in step 409, a determination is made as whether the first class in the duplicate class recited in the class search path sequence is one of the class loader's classes.

If the first class in the duplicate class recited in the class search path sequence is not one of the class loader's classes, then, in step 410, the class loader is marked with a "warning" as being a potential problem. In step 411, a message is displayed to the user (i.e., user of computer system 100) identifying the class loader as being marked with a "warning."

If, however, the first class in the duplicate class recited in the class search path sequence is one of the class loader's classes, then, in step 412, the class loader is marked as "suspect" as being a potential problem. In step 413, a message is displayed to the user (i.e., user of computer system 100) identifying the class loader as being marked as "suspect."

As used herein, the designation of "warning" is an indication of a lesser potential problem then the designation of "suspect." That is, the designation of "warning" corresponds to one level of severity of a potential problem and the designation of "suspect" corresponds to another level of severity of a potential problem. The designation of "suspect" has a higher level of severity of a potential problem than the designation of "warning."

For example, as illustrated in FIG. 5, class loaders 301D, 301E, 301G and 301H each have a duplicate class in its class search path sequence. With respect to class loader 301D, the first class F of the duplicate class F recited in the class search path sequence for class loader 301D is not found in the classes of class loader 301D. Instead, the first class F of the duplicate class F recited in the class search path sequence for class loader 301D is found in its parent's class loader. As a result, there is less of a potential class loader problem (e.g., class cast exceptions, class not found exceptions, no class definition found exceptions, etc.) than the alternative of having the first class of the duplicate class recited in the class search path sequence of class loader 301 being one of the classes of class loader 301 as is the case with class loaders 301E, 301G and 301H. In such a scenario, class loader 301 is marked with a "warning" 501 as shown in FIG. 5.

As further shown in FIG. 5, with respect to class loader 301E, the first class K of the duplicate class K recited in the class search path sequence for class loader 301E is found in the classes of class loader 301E. Similarly, with respect to class loader 301G, the first class F of the duplicate class F recited in the class search path sequence for class loader 301G is found in the classes of class loader 301G. In another example, with respect to class loader 301H, the first class L of the duplicate class L recited in the class search path sequence for class loader 301H is found in the classes of class loader 301H. When the first class of the duplicate class recited in the class search path sequence for class loader 301 is found in class loader's 301 classes, there is a greater potential for a class loader problem (e.g., class cast exceptions, class not found exceptions, no class definition found exceptions, etc.) than the alternative of having the first class of the duplicate class recited in the class search path sequence of class loader 301 not being one of the classes of class loader 301. In such a scenario, class loader 301 is marked with the designation of "suspect" 502A-502C as shown in FIG. 5 for class loaders 301E, 301G and 301H, respectively. While the foregoing discusses designating class loaders 301 with the designation of "warning" or "suspect," the principles of the present invention are not to be limited to such designations. The principles of the present invention include any designation that is used to signify different levels of severity in potential class loader problems.

By utilizing the class search path sequence for each class loader 301 to identify those class loaders 301 with a class search path sequence that contains a duplicate class, class loaders 301 that may pose a potential problem can be identified. By implementing such an algorithm to identify such class loaders during compile time or build time in a development environment (e.g., test system), those class loaders that are potentially problematic (i.e., those class loaders that have may have a problem loading the classes resulting in class cast exceptions, class not found exceptions, no class definition found exceptions, etc.) can be identified prior to or during the deployment of the classes thereby preventing the problems from occurring.

Returning to step 408 of FIG. 4, in conjunction with FIGS. 1-3 and 5, if there is not a duplicate class in the class search path sequence, or upon displaying a message identifying class loader 301 as being marked with a "warning" or as "suspect" in steps 411 and 413, respectively, then, in step 414, a determination is made as to whether class loader 301 has any children.

If class loader 301 does not have any children, then a determination is made as to whether the stack is empty in step 402.

If, however, class loader 301 has children, then, in step 415, the children are pushed to the stack.

Code written in the Java® programming language for implementing algorithm 400 is shown below.

```
procedure detectSuspectClassLoader(ClassLoader node):
    Stack stack = new Stack
    stack.push(node)
    while not stack.isEmpty( ){
        node = stack.pop( )
        if(node.isParentFirst( )){
            node.setSearchPathSequence(node.getParentSearchPath( )+node.getClasses( ))
        } else {
            node.setSearchPathSequence(node.getClasses( ) + node.getParentSearchPathSequence( ))
        }
        if(node.getParentSearchPathSequence( ).contains(node.getClasses( ))
        ){
            node.setWarning(true)
            for each duplicate class {
                if(node.getClasses( ).contains(first duplicate class)){
                    node.setSuspect(true)
                }
            }
        }
        if(node.hasChildren( ){
            for each node.child{
                stack.push(node.child)
            }
        }
    }
```

As discussed above, algorithm 400 may be implemented during compile time or build time in a development environment (e.g., test system) to detect possible class loader problems before production deployment. In this manner, those class loaders that are potentially problematic (i.e., those class loaders that have may have a problem loading the classes resulting in class cast exceptions, class not found exceptions, no class definition found exceptions, etc.) can be identified prior to or during the deployment of the classes thereby preventing the problems from occurring.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for identifying potential class loader problems, the computer program product comprising a computer readable storage medium having program code embodied therewith, the program code comprising the programming instructions for:
   loading a set of class loaders into memory;
   arranging said set of class loaders hierarchically into parent-child relationships;
   generating a class search path sequence for each class loader in said set of class loaders to detect and identify potential class loader problems;
   identifying one or more class loaders in said set of class loaders with a duplicate class in its class search path sequence;
   marking a first class loader with a first level of severity of a potential problem in response to detecting a first class in a duplicate class recited in a class search path sequence of said first class loader that is not one of one or more classes of said first class loader;
   marking a second class loader with a second level of severity of a potential problem in response to detecting a first class in a duplicate class recited in a class search path sequence of said second class loader that is one of one or more classes of said second class loader; and
   displaying a message identifying said identified one or more class loaders as being potentially problematic during compile time or build time prior to or during deployment of classes thereby preventing problems from occurring.

2. The computer program product as recited in claim 1, wherein the program code further comprises the programming instructions for:
   composing said class search path sequence for a class loader by prefixing a parent node's class search path to one or more classes of said class loader in response to said class loader having a delegation mode of parent-first.

3. The computer program product as recited in claim 1, wherein the program code further comprises the programming instructions for:
   composing said class search path sequence for a class loader by postfixing a parent node's class search path to one or more classes of said class loader in response to a class loader having a delegation mode of parent-last.

4. The computer program product as recited in claim 1, wherein said hierarchical arrangement is implemented by a stack.

5. The computer program product as recited in claim 1, wherein said class search path sequence for each class loader is generated during one of the following: a compile time in a development environment and a build time in said development environment.

6. The computer program product as recited in claim 5, wherein said development environment is a test system.

7. The computer program product as recited in claim 1, wherein said first class in said duplicate class recited in said class search path sequence of said first class loader is found in a parent class loader of said first class loader.

8. The computer program product as recited in claim 1, wherein said second level of severity of said potential problem is a higher level of severity of a potential problem than said first level of severity of said potential problem.

9. A system, comprising:
   a memory unit for storing a computer program for identifying potential class loader problems; and
   a processor coupled to the memory unit, wherein the processor is configured to execute the program instructions of the computer program comprising:
      loading a set of class loaders into memory;
      arranging said set of class loaders hierarchically into parent-child relationships;
      generating a class search path sequence for each class loader in said set of class loaders to detect and identify potential class loader problems;
      identifying one or more class loaders in said set of class loaders with a duplicate class in its class search path sequence;
      marking a first class loader with a first level of severity of a potential problem in response to detecting a first class in a duplicate class recited in a class search path sequence of said first class loader that is not one of one or more classes of said first class loader;
      marking a second class loader with a second level of severity of a potential problem in response to detecting a first class in a duplicate class recited in a class search path sequence of said second class loader that is one of one or more classes of said second class loader; and
      displaying a message identifying said identified one or more class loaders as being potentially problematic during compile time or build time prior to or during deployment of classes thereby preventing problems from occurring.

10. The system as recited in claim 9, wherein the program instructions of the computer program further comprise:
    composing said class search path sequence for a class loader by prefixing a parent node's class search path to one or more classes of said class loader in response to said class loader having a delegation mode of parent-first.

11. The system as recited in claim 9, wherein the program instructions of the computer program further comprise:
    composing said class search path sequence for a class loader by postfixing a parent node's class search path to one or more classes of said class loader in response to a class loader having a delegation mode of parent-last.

12. The system as recited in claim 9, wherein said hierarchical arrangement is implemented by a stack.

13. The system as recited in claim 9, wherein said class search path sequence for each class loader is generated during one of the following: a compile time in a development environment and a build time in said development environment.

14. The system as recited in claim 13, wherein said development environment is a test system.

15. The system as recited in claim 9, wherein said first class in said duplicate class recited in said class search path sequence of said first class loader is found in a parent class loader of said first class loader.

16. The system as recited in claim 9, wherein said second level of severity of said potential problem is a higher level of severity of a potential problem than said first level of severity of said potential problem.

* * * * *